United States Patent [19]

Thompson

[11] Patent Number: 4,542,281

[45] Date of Patent: Sep. 17, 1985

[54] THERMAL PRINTER CONTRAST CONTROL

[75] Inventor: Leslie L. Thompson, Macedon, N.Y.

[73] Assignee: Combustion Engineering, Inc., Windsor, Conn.

[21] Appl. No.: 585,724

[22] Filed: Mar. 2, 1984

[51] Int. Cl.[4] .......... H05B 1/02; B41J 3/20; G01D 15/10

[52] U.S. Cl. .......... 219/216; 346/76 PH; 219/497

[58] Field of Search .......... 346/76 PH; 400/120; 219/216 PH, 216, 497, 494, 501

[56] References Cited

U.S. PATENT DOCUMENTS

| | | | |
|---|---|---|---|
| 2,732,477 | 1/1956 | Runaldue | 219/497 |
| 3,308,271 | 3/1967 | Hilbiber | 219/501 |
| 3,564,204 | 2/1971 | Mense | 219/497 |
| 3,999,190 | 12/1976 | Brown | 219/501 |
| 4,324,486 | 4/1982 | Nishikawa | 219/216 PH |
| 4,370,666 | 1/1983 | Noda | 219/216 PH |
| 4,409,600 | 10/1983 | Minowa | 219/216 PH |

FOREIGN PATENT DOCUMENTS

| | | | |
|---|---|---|---|
| 2457771 | 1/1981 | France | 346/76 PH |
| 54-4144 | 1/1979 | Japan | 346/76 PH |
| 54-0036737 | 3/1979 | Japan | 400/120 |
| 54-141650 | 11/1979 | Japan | 219/216 PH |
| 58-53460 | 3/1983 | Japan | 346/76 PH |

*Primary Examiner*—Roy N. Envall, Jr.
*Assistant Examiner*—Teresa J. Walberg
*Attorney, Agent, or Firm*—David L. Smith

[57] ABSTRACT

A method and apparatus for controlling the voltage and hence the power delivered to a thermal print head heater. The voltage and hence the power delivered to a thermal print head heater is controlled in response to the ambient temperature surrounding the thermal print head so as to produce printed characters with uniform contrast between the character and the paper surrounding the character independent of the ambient temperature surrounding the print head.

8 Claims, 2 Drawing Figures

THERMAL PRINTER CONTRAST CONTROL

BACKGROUND OF THE INVENTION

The present invention relates to thermal printers and in particular to controlling the power delivered to a thermal print head in response to changes in the ambient temperature surrounding the print head such that characters printed over a wide range of ambient temperatures are printed with the same contrast relative to the surrounding paper.

A thermal print head is used to imprint characters on thermal paper. Thermal paper consists of several layers of laminated material. The surface layer is a temperature sensitive material that the thermal print head melts in the form of a character exposing a colored ink layer beneath the melted surface layer. To melt the surface layer of thermal paper the thermal print head is heated. In prior art thermal printers, the thermal print head was heated by applying a constant voltage and hence constant power to the print head. As the ambient temperature of the print head environment varied, the temperature of the thermal print head would vary resulting in a varying contrast between printed characters and the surrounding paper at one ambient temperature as compared to the contrast between printed characters and the surrounding paper at another ambient temperature. The varying contrast is of greater concern when the printing process spans a long time period such as recording process variables over a span of days or weeks, during which a change in the ambient temperature surrounding the thermal print head is likely.

It is an object of the present invention to provide an inexpensive solution to compensate for changes in thermal paper contrast caused by changes in the ambient temperature surrounding the thermal print head.

SUMMARY OF THE INVENTION

The present invention provides a method and apparatus for sensing the ambient temperature at the print head of a thermal printer and for controlling the voltage, and hence the power, to the print head in response to changes in the ambient temperature. In accordance with the present invention, the ambient temperature surrounding the print head is sensed. The voltage and hence the power delivered to the thermal print head is controlled in response to the sensed ambient temperature such that the voltage is decreased as the ambient temperature increases and the voltage is increased as the ambient temperature decreases. Thus, the contrast between the colored ink exposed when a character is printed and the paper surrounding the character is consistent and independent of the ambient temperature surrounding the thermal print head.

DESCRIPTION OF THE PREFERRED EMBODIMENT

Figure 1:
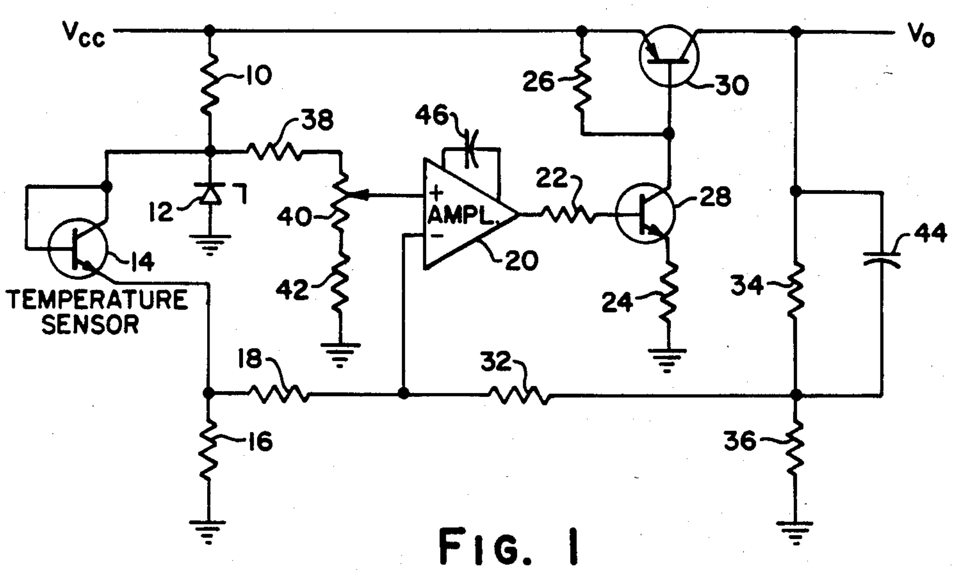
FIG. 1 is a schematic of the thermal print head voltage control circuit, in accordance with the present invention.

Referring to the drawing, initially to FIG. 1, there is depicted therein a circuit for controlling the voltage and hence the power delivered to a thermal print head in accordance with the present invention. Busbar $V_{cc}$ provides dc power to heat a thermal print head. Resistor 10 is connected between the $V_{cc}$ busbar and the cathode of temperature compensated zener diode 12; the anode of diode 12 is grounded completing a circuit in which resistor 10 supplies a bias current to operate diode 12 in the breakdown region. Diode 12 provides a temperature independent reference voltage at its cathode. For a temperature compensated zener diode type 1N823A, a resistor 10 of 2 kilohms will supply the necessary biasing current when the $V_{cc}$ busbar provides 24 volts. The voltage at the junction of resistor 10 and the cathode of diode 12 for a 1N823A diode is 6.2 volts.

Transistor 14, a 2N2222A transistor in the preferred embodiment, is used to sense the ambient temperature surrounding the print head. Resistor 16 is sized to establish a nominal collector operating current of approximately 0.5 milliamp at room temperature which is approximately 25° C. This maintains a nearly constant current source through transistor 14 and resistor 16 with only a 0.03% change in the current per degree Celcius change in ambient temperature surrounding the thermal print head. A 2N2222A transistor was selected for having a linear temperature coefficient over the temperature range of interest. The 2N2222A transistor has a $V_{BE}$ drop at nominal operating current of 0.6 volts and a temperature coefficient of −2.0 millivolts per °C. Thus, resistor 16 connected between the emitter of transistor 14 and ground is 10 kilohms. The collector and base of transistor 14 are connected to the anode of diode 12. Resistor 18 connected between the juncture of the emitter of transistor 14 and resistor 16 and the negative input terminal of differential amplifier 20 provides the input resistance of differential amplifier 20 as seen by the voltage at the juncture of the emitter of transistor 14 and resistor 16.

Bias resistors 22, 24 and 26 in conjunction with transistors 28 and 30 comprise a power amplification network that controls the voltage $V_o$ delivered to the thermal print head in response to changes in the ambient temperature surrounding the print head as sensed by transistor 14 and manifested in a voltage at the junction of the emitter of transistor 14 and resistor 16. In the preferred embodiment, resistor 22 is a 1 kilohm resistance, resistor 24 is an 820 ohm resistance, resistor 26 is a 120 ohm resistance, transistor 28 is a 2N2222A transistor and transistor 30 is a D45H11 transistor. Resistor 22 connects between the output of differential amplifier 20 and the base of transistor 28. Resistor 24 connects between the emitter of transistor 28 and ground. Resistor 26 connects between the emitter of transistor 30 and the collector of transistor 28. The collector of transistor 28 connects to the base of transistor 30. The emitter of transistor 30 connects to the $V_{cc}$ bus; $V_o$ is taken from the collector of transistor 30. The operation of the power amplifier is discussed below.

Figure 2:
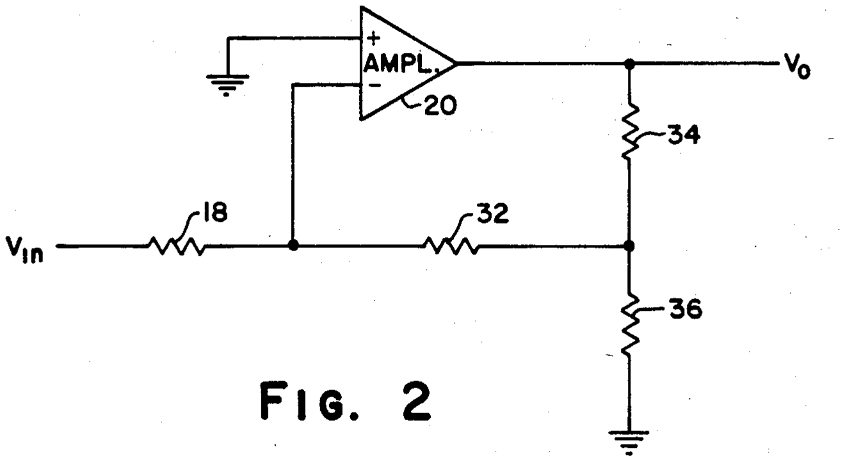
FIG. 2 is a simplified schematic of a portion of the circuit of FIG. 1 used to determine the gain of the differential amplifier.

A 75 millivolt change in $V_o$ per °C. change in ambient temperature surrounding the thermal print head provides the necessary change in thermal print head heater power to obtain a consistent contrast between a printed character and the surrounding paper in the preferred embodiment. To obtain a 75 millivolt per °C change in $V_o$ from the two millivolt per °C temperature coefficient of transistor 14, the voltage at the juncture of the emitter of transistor 14 and resistor 16 must be amplified approximately 37.5 times. Although a single feedback resistor having a resistance of 37.5 times the resistance of resistor 18 between $V_O$ and the juncture of resistor 18 and the negative input terminal of differential amplifier 20 could have been used, since the input resistance, resistor 18, to differential amplifier 20 must be on the order of magnitude of 100 kilohms to prevent loading down transistor 14, a single feedback resistance would have to be so large it would not be readily commerically available. Therefore, a feedback resistance network comprised of resistors 32, 34 and 36 was selected. Resistance 34 connects between the output voltage $V_O$ and the juncture of resistances 32 and 36. Resistance 36 connects between the juncture of resistances 32 and 34 and ground. Resistance 32 connects between the juncture of resistances 34 and 36 and the juncture of resistance 18 and the negative input terminal of differential amplifier 20. The gain of differential amplifier 20 was calculated from the simplified circuit shown in FIG. 2 as:

$$\text{GAIN} = -\left[\frac{R_{32}}{R_{18}} + \frac{R_{34}}{R_{18}} + \frac{R_{32}\,R_{34}}{R_{18}\,R_{36}}\right]$$

Knowing the absolute value of the gain desired was approximately 37.5, the values of resistors 18, 32, 34 and 36 were selected in the preferred embodiment to be 80.6 kilohms, 1 megaohm, 20 kilohms and 10 kilohms, respectively.

The series network of resistor 38, potentiometer 40 and resistor 42 are connected between the cathode of diode 12 and ground. The wiper of potentiometer 40 supplies a voltage to the positive input terminal of differential amplifier 20 to offset the output of differential amplifier 20 by the voltage applied to the positive input terminal and to offset $V_o$ by a corresponding voltage. The series resistance network comprised of resistor 38, potentiometer 40 and resistor 42 could just as well have been provided by a single potentiometer equivalent in resistance to the sum of the resistances of resistor 38, potentiometer 40 and resistor 42. However, the wiper voltage resolution would not be as great. In the preferred embodiment, resistor 38 is a 5.6 kilohm resistance, potentiometer 40 is a 2 kilohm resistance, and resistor 42 is a 64 kilohm resistance.

Capacitor 44, a 0.1 microfarad capacitance connected in parallel with resistor 34, provides frequency compensation for the feedback network. Capacitor 46, a 10 picofarad capacitance in the preferred embodiment, is employed to provide a tuned band width for an otherwise uncompensated differential amplifier 20, a 201A amplifier, to increase stability.

The operation of the power amplifier is best understood in the context of the voltage control circuit as a whole as shown in FIG. 1. As stated above, resistor 16 is sized to provide a nominal transistor 14 emitter current of approximately 0.5 milliamp at room temperature which is approximately 25° C. As the ambient temperature surrounding the thermal print head increases, the base to emitter voltage of transistor 14 decreases and the emitter current of transistor 14 is nearly constant however increases the voltage drop across resistor 16. Since the voltage at the juncture of resistors 16 and 18 is the input voltage to the negative terminal of differential amplifier 20, the input voltage to differential amplifier 20 increases. As the input voltage of differential amplifier 20 increases the output voltage of differential amplifier 20 decreases decreasing transistor 28 base current thereby decreasing transistor 28 collector to emitter current, reducing the base current of transistor 30 which in turn reduces the emitter to collector current of transistor 30 which causes the output voltage $V_o$ to decrease.

As the ambient temperature surrounding the thermal print head decreases, the base to emitter voltage of transistor 14 increases thereby decreasing the emitter current of transistor 14 causing the voltage across resistor 16 to decrease. The reduced voltage across resistor 16 produces an increased output from diffential amplifier 20 increasing the base current to transistor 28, in turn increasing the collector to emitter current of transistor 28. The increased collector current of transistor 28 increases the base current of transistor 30 thereby turning transistor 30 on more in turn increasing output voltage $V_O$.

In this manner, as the ambient temperature surrounding the thermal print head increases, the voltage applied to the thermal print head is reduced proportionally. The temperature increase is sensed by transistor 14 and manifested in a temperature dependent change in the base to emitter voltage of transistor 14 which causes a change in the emitter current of transistor 14. In the preferred embodiment, the voltage control circuit has a range of approximately 25° C.±25° C.; with $V_{cc}$ nominally 24 volts, the control range of $V_o$ is approximately 2 volts with the maximum and minimum determined by the offset voltage introduced by potentiometer 40.

The voltage control circuit of the present invention can use a temperature sensing element other than a 2N2222A transistor. It is only necessary that the output voltage $V_O$ be a function of the sensed ambient temperature surrounding the thermal print head. For the thermal print head heater controlled by the circuit of the preferred embodiment of the present invention, a 75 millivolt change in $V_o$ per °C. change in ambient temperature surrounding the thermal print head is sufficient to maintain the contrast between a printed character and the surrounding paper independent of the ambient temperature surrounding the thermal print head. For other print heads, a different ratio may be required. Although the temperature sensor must be located near the thermal print head to sense the ambient temperature surrounding the print head, the remainder of the circuit may be remotely mounted.

What is claimed is:

1. A circuit for controlling voltage and hence power delivered to a thermal print head heater in response to variations in the ambient temperature surrounding the thermal print head heater, comprising:

a first current limiting resistor;

a temperature compensated zener diode, the temperature compensated diode connected in series with the first current limiting resistor and the series combination connected between a voltage source and an electrical ground such that the first current limiting resistor and the temperature compensated zener diode establish a temperature independent reference voltage source at the cathode of the temperature compensated zener diode;

a transistor having emitter, base and collector leads, and having a linear temperature coefficient for sensing the ambient temperature surrounding the thermal print head heater, the transistor having both the base and collector leads electrically connected to the temperature independent reference voltage source;

a second current limiting resistor, the second current limiting resistor connected between the emitter of the transistor and electrical ground to establish a nominal collector current;

voltage divider means having a first terminal, a second terminal and a divided voltage terminal, the first terminal connected to the temperature independent reference voltage source and the second terminal connected to electrical ground;

a differential amplifier for subtracting the voltage established at the emitter of the transistor from the divided voltage and for producing as an output an amplification of the difference therebetween, the differential amplifier having a first input port for receiving the voltage established at the emitter of the transistor, a second input port for receiving the divided voltage from the divided voltage terminal of the voltage divider means and an output port at which the amplification of the difference between the emitter voltage and the divided voltage is presented; and a power amplifier responsive to the amplified difference signal for controlling voltage and hence power delivered to the thermal print head heater.

2. A circuit for controlling the voltage and hence the power delivered to a thermal print head heater as recited in claim 1 wherein the divided voltage obtainable from the voltage divider means is adjustable.

3. A circuit for controlling voltage and hence power delivered to a thermal print head heater in response to variations in the ambient temperature surrounding the thermal print head heater, comprising:

a temperature independent reference voltage source;

means connected between the temperature independent reference voltage source and ground for sensing the ambient temperature surrounding the thermal print head heater;

an operational amplifier connected to the temperature sensing means and the temperature independent reference voltage source, and having an output signal which is the amplified difference therebetween; and a power amplifier responsive to the amplified difference signal for controlling the voltage and hence the power delivered to the thermal print head heater.

4. A circuit for controlling the voltage and hence the power delivered to a thermal print head heater as recited in claim 3 wherein the temperature sensing means is a transistor having a linear temperature coefficient.

5. A circuit for controlling the voltage and hence the power delivered to a thermal print head heater as recited in claim 4 wherein the temperature independent reference voltage source comprises a temperature compensated zener diode.

6. A circuit for controlling the voltage and hence the power delivered to a thermal print head heater as recited in claim 3 wherein the temperature independent reference voltage source comprises a temperature compensated zener diode.

7. A method for controlling voltage and hence power delivered to a thermal print head heater in response to variations in the ambient temperature surrounding the thermal print head heater, comprising the steps of:

(a) continuously sensing the ambient temperature surrounding the thermal print head heater;

(b) continuously generating a voltage signal representative of the sensed ambient temperature;

(c) establishing a nonground temperature independent voltage reference signal;

(d) continuously comparing the nonground temperature independent voltage reference signal to the voltage signal representative of the sensed ambient temperature, resulting in a compared voltage signal;

(e) increasing the voltage and hence the power delivered to the thermal print head heater upon the compared voltage signal increasing, corresponding to a decreasing ambient temperature surrounding the thermal print head heater;

(f) decreasing the voltage and hence the power delivered to the thermal print head heater upon the compared voltage signal decreasing, corresponding to an increasing ambient temperature surrounding the thermal print head heater;

(g) maintaining the voltage and hence the power delivered to the thermal print head heater constant upon the compared voltage signal remaining constant, corresponding to a stabilized ambient temperature surrounding the thermal print head heater; and (h) repeating step (e) through (g) as required.

8. A method for controlling voltage and hence power delivered to a thermal print head heater in response to variations in the ambient temperature surrounding the thermal print head heater, comprising the steps of:

(a) continuously sensing the ambient temperature surrounding the thermal print head heater;

(b) continuously generating a voltage signal representative of the sensed ambient temperature;

(c) establishing a nonground temperature independent voltage reference signal;

(d) continuously comparing the nonground temperature independent voltage reference signal to the voltage signal representative of the sensed ambient temperature, resulting in a compared voltage signal;

(e) increasing the voltage and hence the power delivered to the thermal print head heater in proportion to the temperature decrease upon the compared voltage signal increasing, corresponding to a decreasing ambient temperature surrounding the thermal print head heater;

(f) decreasing the voltage and hence the power delivered to the thermal print head heater in proportion to the temperature increase upon the compared voltage signal decreasing, corresponding to an increasing ambient temperature surrounding the thermal print head heater;

(g) maintaining the voltage and hence the power delivered to the thermal print head heater constant upon the compared signal remaining constant, corresponding to a stabilized ambient temperature surrounding the thermal print head heater; and (h) repeating steps (e) through (g) as required.

* * * * *